United States Patent
Watanabe

[11] Patent Number: 5,918,899
[45] Date of Patent: Jul. 6, 1999

[54] AIR BAG CONTROLLER

[75] Inventor: Yasuharu Watanabe, WestBloomfield, Mich.

[73] Assignee: Nissan Motor Co., Ltd., Kanagawa-ken, Japan

[21] Appl. No.: 08/965,156

[22] Filed: Nov. 6, 1997

[30] Foreign Application Priority Data

Nov. 7, 1996 [JP] Japan .................. 8-295212

[51] Int. Cl.$^6$ .............. B60R 21/32; B60Q 1/00
[52] U.S. Cl. .......................... 280/735; 340/438
[58] Field of Search .............. 280/735; 340/438

[56] References Cited

U.S. PATENT DOCUMENTS

| 5,085,464 | 2/1992 | Behr et al. | 280/735 |
| 5,390,951 | 2/1995 | Iyoda | 280/730 |
| 5,416,704 | 5/1995 | Takia | 364/424.05 |
| 5,475,269 | 12/1995 | Takeuchi | 307/10.1 |
| 5,544,914 | 8/1996 | Borninski et al. | 280/735 |
| 5,732,375 | 3/1998 | Cashler | 701/45 |
| 5,737,224 | 4/1998 | Jeenicke et al. | 364/424.055 |
| 5,788,273 | 8/1998 | Jeenicke et al. | 280/735 |
| 5,803,491 | 9/1998 | Barnes et al. | 280/735 |

*Primary Examiner*—Lanna Mai
*Assistant Examiner*—Jason S. Brooks
*Attorney, Agent, or Firm*—McDermott, Will & Emery

[57] ABSTRACT

Expansion enable/disable information expressing enable or disable of the expansion of an air bag at an assistant driver's seat is input from a cut-off switch, and the expansion enable/disable information is once retained in a register in a CPU. If an acceleration detected by a G-sensor and applied to a motor vehicle exceeds 2G for example, then any change in the expansion enable/disable information retained in the register of the CPU is inhibited by the CPU itself; and thus a change of the expansion enable/disable information retained in the register is inhibited even though the expansion enable/disable information input to the cut-off switch has been changed by the force majeure during the collision of the motor vehicle. Thus, any erroneous expansion of the air bag by the acceleration can be prevented during collision as long as the expansion inhibit state is continuing.

6 Claims, 2 Drawing Sheets

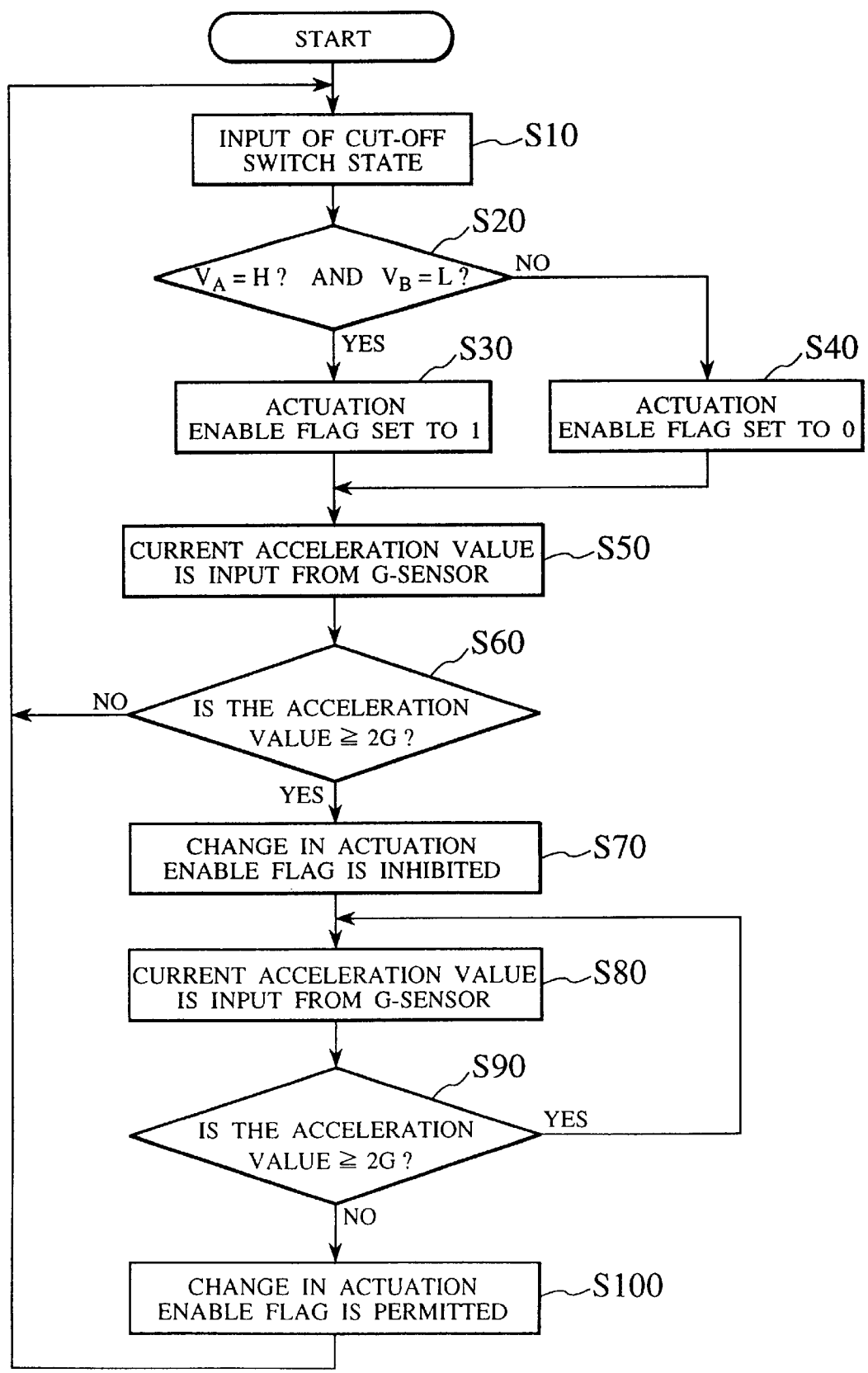

AIR BAG CONTROLLER

The contents of Application No. TOKUGANHEI 8-295212, with a filing date of Nov. 7, 1996 in Japan, are hereby incorporated by reference.

BACKGROUND OF THE INVENTION

1. Field of the Invention

The present invention relates to an air bag controller, and more particularly to an air bag controller which enables or prohibits the expansion of an air bag module only by a simple operation.

2. Description of the Prior Art

Motor vehicles equipped with air bag modules are being manufactured in recent years to secure the safety for passengers at the time of a collision of a motor vehicle.

In the motor vehicle equipped with such an air bag module at the assistant driver's seat, an exclusive key switch is provided for canceling the operation of the air bag module at the assistant driver's seat, and the expansion of the air bag module at the assistant driver's seat is prohibited by directly disconnecting, with the key switch, a harness which supplies an ignition current required for the expansion of the air bag module at the assistant driver's seat.

However, in the conventional air bag controller, the harness, connected to a squib in the air bag module for the assistant driver's seat, is directly disconnected using the key switch. Therefore even though the key switch has been set to a state for prohibiting the expansion of the air bag module at the assistant driver's seat, for example, chattering or the like occurs resulting in the key switch making contact and being set to a state permitting expansion of the air bag.

It is also required that the key switch is provided with a switch contact having a high reliability for applying an ignition current to the squib.

SUMMARY OF THE INVENTION

The present invention is conceived to overcome the bove mentioned problems and its object is to provide an air bag controller capable of preventing erroneous expansion of the bag during a collision of the motor vehicle and capable of contributing to the enhancement of the reliability.

To achieve the object described above, according to the present invention there is provided an air bag controller capable of detecting the collision of the motor vehicle and controlling the certain expansion of the air bag module provided at the assistant driver's seat comprising: an operation input means for generating an expansion enable/disable information expressing the enable or disable of the expansion of the air bag module at the assistant driver's seat, an information holding means for holding the expansion enable/disable information, an acceleration detection means for detecting an acceleration applied to the motor vehicle, an information change prohibiting means for prohibiting any change in expansion enable/disable information held in the information holding means if the acceleration detected by the acceleration detection means has exceeded a predetermined value, and an expansion control means for controlling the expansion of the air bag module at the assistant driver's seat based on the expansion enable/disable information held in the information holding means if the acceleration detected by the acceleration detection means has exceeded the predetermined value.

According to the present invention, the expansion enable/disable information expressing the enable or disable of the expansion of air bag for the assistant driver's seat is input from the operation input means, and the expansion enable/disable information thus input is retained in information holding means. If an acceleration applied to a motor vehicle and detected by acceleration detection means exceeds a predetermined value, any change in expansion retained in the information holding means is prohibited by information change inhibit means; therefore, even though the expansion enable/disable information input to the operation input means has been changed by force majeure at the time of a car collision, the change in the expansion enable/disable information retained in the information holding means will be prohibited; and because of this, even though a change in switch condition such as chattering occurs by the impact during a car collision, any change in the switch condition can be ignored and, as a result, wasteful expansion in error of air bag for the assistant driver's seat can be prevented. Also, the expansion of the air bag for the assistant driver's seat can be definitively approved or prohibited only by a simple operation and this feature is able to contribute to the enhancement of the reliability of the air bag controller.

In a preferred embodiment of the present invention, if the acceleration applied to a motor vehicle has exceeded the predetermined value, then the information change inhibit means prohibits any change in the expansion enable/disable information retained in the information holding means at least for a predetermined duration required for expanding the air bag module.

In the preferred embodiment of the present invention, the information holding means comprises a memory of a microprocessor.

To achieve the object described above, according to the present invention there is provided an air bag controller for controlling a certain expansion of an air bag module provided for an assistant driver's seat by detecting a collision of a motor vehicle, comprising: an operation input circuit for generating expansion enable/disable information expressing the enable or disable of the expansion of the air bag module at the assistant driver's seat; an information holding unit for holding the expansion enable/disable information; an acceleration detection unit for detecting an acceleration applied to the motor vehicle; an information change inhibit unit for inhibiting any change in expansion enable/disable information held in the information holding unit if an acceleration detected by the acceleration detection unit has exceeded a predetermined value; and an expansion control circuit for controlling the expansion of the air bag module at the assistant driver's seat based on the expansion enable/disable information held in the information holding unit if the acceleration detected by the acceleration detection unit has exceeded the predetermined value.

In the preferred embodiment of the present invention, the information change inhibit unit is intended to inhibit the change of the expansion enable/disable information held in the information holding unit for a predetermined duration required at least for expanding the air bag module if the acceleration applied to the motor vehicle has exceeded the predetermined value.

In the preferred embodiment of the present invention, the information holding unit comprises a memory of a microprocessor.

The nature, principle and utility of the invention will become more apparent from the following detailed description when read in conjunction with the accompanying drawings.

BRIEF DESCRIPTION OF THE DRAWINGS

In the accompanying drawings:

FIG. 2 is a flowchart for explaining the operation of the air bag controller.

DESCRIPTION OF THE PREFERRED EMBODIMENTS

Figure 1:
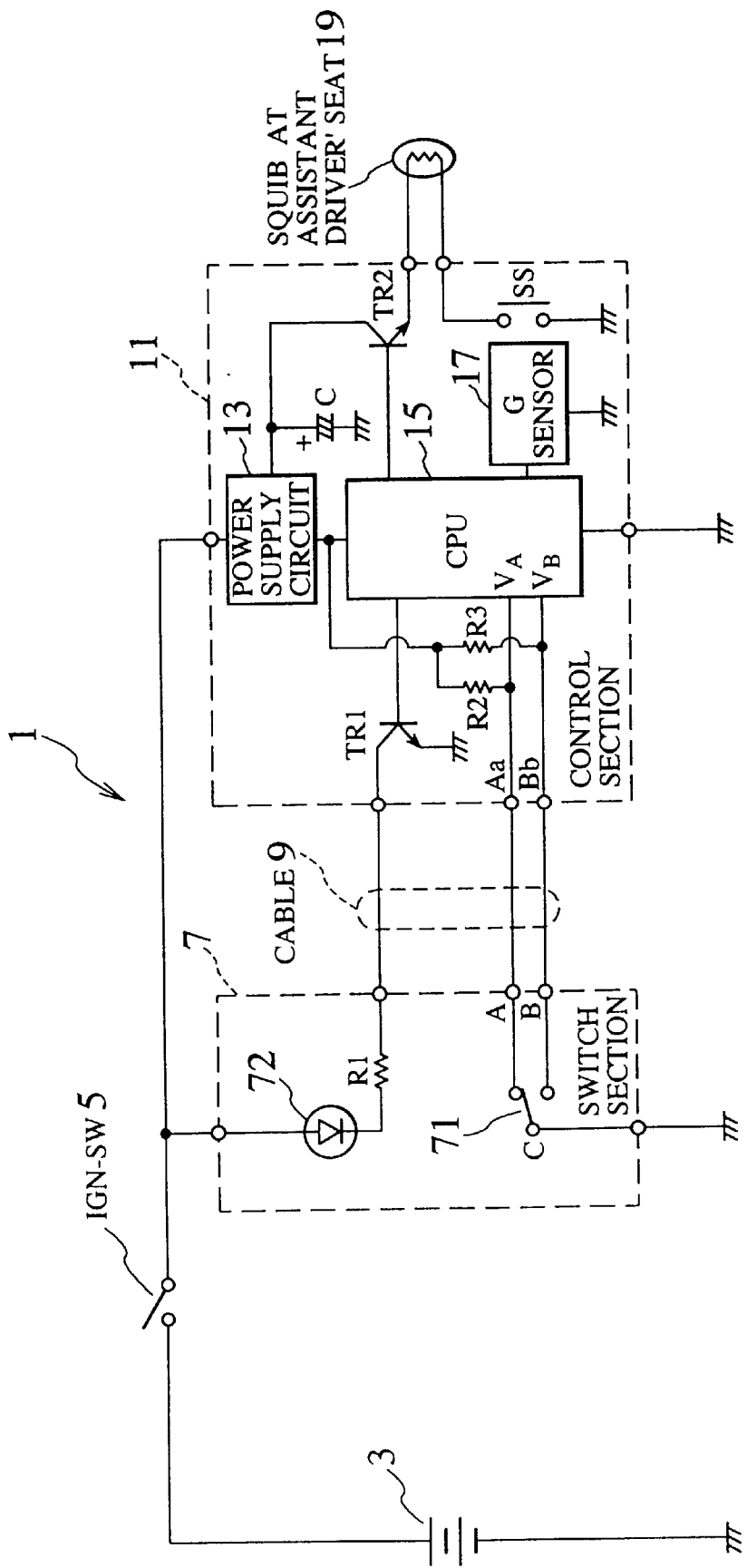
FIG. 1 is a circuit diagram showing the system configuration of the air bag controller related to a preferred embodiment of the present invention.

The present invention will now be described hereinafter with reference to the accompanying drawings showing preferred embodiments.

FIG. 1 illustrates the system configuration of the air bag controller related to the preferred embodiment of the present invention.

In FIG. 1, a battery 3 for supplying electric power to an on-board electronic equipment may be installed in an engine room for instance. An ignition switch 5 intended to be closed for supplying an electric power from the battery 3 to the equipment is equipped in a lower portion of a steering wheel.

As shown in FIG. 1, the air bag controller 1 comprises a control section 11 which controls the expansion of an air bag module for an assistant driver's seat, a switch section 7 which generates expansion enable/disable information expressing whether the expansion of the air bag module for assistant driver's seat is to be prohibited or approved, and a cable 9 connecting the control section 11 to the switch section 7.

The switch section 7 comprises a cut-off switch 71 which instructs the enable or disable of the expansion of the air bag module for assistant driver's seat, an LED 72 which informs that the expansion of air bag module for the assistant driver's seat is in the state of enable, and a current limiting resistor R1 which limits a lighting current flowing to the LED 72.

The control section 11 comprises a power supply circuit 13 which stabilizes an electric power supplied from the battery 3 through the ignition switch 5 and supplies the stabilized electric power to a CPU 15 and a squib 19 for the assistant driver's seat. The CPU 15 includes ROM and RAM and is intended to control the equipment in conformity with the stored control program and control data. The control section 11 also comprises a G-sensor 17 for detecting an acceleration value applied to a motor vehicle, pull-up resistors R2 and R3 for converting the state of the cut-off switch 71 transmitted through the cable 9 to the input level of the CPU 15, a drive transistor TR1 for energizing the LED 72 inside the switch section 7, a assistant driver's seat drive transistor TR2 for ON/OFF controlling the power supply to the assistant driver's seat squib 19, a safety sensor SS which conducts when a set limit is exceeded during a collision of the motor vehicle, and a capacitor C for supplying the output of the power supply circuit 13, after accumulating the power for a predetermined duration, to the squib 19 at the assistant driver's seat.

Also, the squib 19 at the assistant driver's seat for expanding the air bag is to be built in the air bag module for the assistant driver's seat provided inside the upper left portion of an instrument panel. Also, the control section 11 is to be located at a convenient place for detecting the collision of the motor vehicle, such as inside a cabinet body (not shown in the drawings) mounted at a floor tunnel portion of the car body. Moreover, the switch section 7 is to be mounted in an instrument panel in front of the driver's seat.

Next, the operation of air bag controller 1 will be explained by using a flowchart shown in FIG. 2.

Firstly, in step S10, the state of cut-off switch 71 is input as signal A and signal B. Also, signal A and signal B expressing the state of cut-off switch 71 are connected to pull-up resistors R2 and R3 through the cable 9 as shown in FIG. 1. Therefore, if the fixed contact C of the cut-off switch 71 is connected to a switch-over contact A and a switch-over contact B is in open state, then the input voltage $V_A$ at CPU 15 is at low level and the input voltage $V_B$ is at high level. On the other hand, the fixed contact C of the cut-off switch 71 is connected to the switch-over contact B; and if the switch-over contact A is in the open state, then the input voltage $V_A$ at the CPU 15 is at high level, and the input voltage $V_B$ is at low level.

Next, in step S20, the CPU 15 judges whether the cut-off switch 71 is in the state of expansion enable state expressing the expansion enable as one of expansion enable/disable information of the air bag module for assistant driver's seat. That is, whether the state of signal A is $V_A$=High and the state of signal B is $V_B$=Low is judged. Here, if expansion enable state occurs, the operation proceeds to step S30; but if expansion enable state does not occur, that is, in the case of expansion inhibit state, the operation proceeds to step S40.

In step S30, if the state of cut-off switch 71 is in the expansion enable state expressing the expansion of the air bag module for assistant driver's seat, then an actuation enable flag expressing the approval for expansion actuation of the air bag module for assistant driver's seat is set to "1". The actuation enable flag is constituted by a register in the CPU 15.

The output of this actuation enable flag is connected to the base of a transistor TR2 for driving the assistant driver's seat and, therefore, if the actuation enable flag is set to "1", then the transistor TR2 for driving the assistant driver's seat is set to ON state. At the same time, the base of the drive transistor TR1 is set to high level, ON control is performed, and the LED inside the switch section 7 is lighted; and then the driver and passengers are informed of the air bag module for the assistant driver's seat which has been set to the expansion possible state.

On the other hand, in step S40, if the cut-off switch 71 is in expansion inhibit state expressing no enable for expansion, then this actuation enable flag is cleared to "0". If the actuation enable flag has been cleared to "0", the transistor TR2 for driving assistant driver's seat is set to OFF state. At the same time, the base of the drive transistor TR1 is set to low level, OFF control is performed, and the LED inside the switch section 7 is turned off, and the driver and passengers are informed of the air bag module for assistant driver's seat which has been set to expansion impossible state.

Next, in step S50, the CPU 15 inputs a current acceleration value from G-sensor 17.

Next, in step S60, the CPU 15 judges whether the input acceleration value is higher than 2G, for example. Here, if the acceleration value is higher than 2G, then one's own car is in the state of car collision and thus step S70 occurs. On the other hand, if the acceleration value is less than 2G, the one's own car has not entered the collision state and thus the operation returns to the step S10 and the processing of steps S10 to S60 is repeated.

Next, in step S70, one's own car is already in a collision state and thus the actuation enable flag set in step S30 or S40 is frozen to a change inhibit state. That is, the freezing to change inhibit state can be achieved by setting a register to rewrite inhibit state in the CPU 15 constituting the actuation enable flag.

Here, the change inhibit state for the actuation enable flag should be held for a predetermined duration required for the expansion of air bag module.

Therefore, even though there is a change in contact state of the cut-off switch 71 due to the impact during collision of one's own car, the change in contact state of the cut-off switch 71 can be ignored because the actuation enable flag has been frozen to the change inhibit state.

In consequence, if a child seat is placed or there in no passenger in the assistant driver's seat, and the cutoff switch 71 has been set to the expansion inhibit state, then the expansion of the air bag module at assistant driver's seat can be prohibited definitely and wasteful erroneous expansion of the air bag module at the assistant driver's seat can be prevented.

On the other hand, if there is a passenger in the assistant driver's seat and the cut-off switch 71 has been set to the expansion enable state, then the expansion of the air bag module at assistant driver's seat has been permitted, and the drive transistor TR2 at assistant driver's seat is controlled to ON state and becomes conductive when the safety sensor SS has detected the collision of the motor vehicle in this state.

As a result, a current flows to a circuit from the power supply circuit 13 to assistant driver's seat drive transistor TR2 in ON state, assistant driver's seat squib 19, safety sensor SS and ground for expanding the air bag module at assistant driver's seat. Moreover, the assistant driver's seat squib 19 is heated suddenly and the air bag module at assistant driver's seat is expanded.

Next, at the step S80, the CPU 15 inputs a current acceleration value from G-sensor 17.

Next, at the step S90, the CPU 15 judges whether the input acceleration value is higher than 2G for example. Here, if the acceleration value is higher than 2G, then one's own car continues to be in a collision state, and thus the operation proceeds to the step S80. On the other hand, when the acceleration value is less than 2G, the one's own car is from collision state to stop state or in running state at a low acceleration, therefore, at the step S100, a register in the CPU 15 constituting the actuation enable flag is set to a rewrite enable state, the change inhibit state is canceled, and the operation returns to the step S10 and repeats the processing.

As described above, the expansion enable/disable information expressing the enable/disable of the expansion of the air bag module at assistant driver's seat is input from the cut-off switch 71, and the expansion enable/disable information is once held in a register of the CPU 15. If the acceleration applied to the motor vehicle detected by the G-sensor 17 exceeds 2G, for example, any change in the expansion enable/disable information retained in a register of the CPU 15 is prohibited by the CPU 15; thus, even though the expansion enable/disable information input to the cut-off switch 71 has changed by the force majeure, any change in the expansion enable/disable information retained in the register will be prohibited; for example, even though a change such as chattering in the switch state occurs in the cutoff switch 71 by the impact during a collision, the contents retained in the register of the CPU 15 are not subjected to change; and the change in the state of the cut-off switch 71 can be neglected at the base of assistant driver's seat drive transistor TR2 and, as a result, wasteful erroneous expansion of the air bag module for assistant driver's seat can be prevented. Also, the expansion of the air bag module at assistant driver's seat can be definitively permitted or prohibited only by a simple operation and thus this system is able to contribute to the enhancement of the air bag controller.

It should be understood that many modifications and adaptations of the invention will become apparent to those skilled in the art and it is intended to encompass such obvious modifications and changes in the scope of the claims appended hereto.

What is claimed is:

1. An air bag controller for controlling a certain expansion of an air bag module provided for an assistant driver's seat by detecting a collision of a motor vehicle, comprising:

an operation input means operated by an operator for generating either one of an expansion able signal and an expansion disable signal expressing the enablement or disablement of the expansion of the air bag module at said assistant driver's seat respectively;

an information holding means for holding either of said expansion enable information and expansion disable information, selection of either of said expansion enable information and said expansion disable information being based on the signal from said operation input means;

an acceleration detection means for detecting an acceleration applied to the motor vehicle;

an information change inhibit means for inhibiting any change in said expansion enable information and said expansion disable information held in said information holding means if either said expansion able or disable signal changes to the expansion disable or able signal while an acceleration detected by said acceleration detection means is exceeding a predetermined value, and for allowing change in said expansion enable information and said expansion disable information when an acceleration detected by said acceleration detection means is below a predetermined value; and an expansion control means for controlling the expansion of said air bag module at said assistant driver's seat based on said either one of the expansion enable information and expansion disable information held in said information holding means if the acceleration detected by said acceleration detection means has exceeded the predetermined value.

2. The air bag controller as claimed in claim 1, wherein said information change inhibit means is intended to inhibit the change of said either one of the expansion enable[/disable] information and expansion disable information held in said information holding means for a predetermined duration required at least for expanding the air bag module if the acceleration applied to the motor vehicle has exceeded the predetermined value.

3. An air bag controller as claimed in claim 1, wherein said information holding means comprises a memory of a microprocessor.

4. An air bag controller for controlling a certain expansion of an air bag module provided for an assistant driver's seat by detecting a collision of a motor vehicle, comprising:

an operation input circuit operated by an operator for generating either one of an expansion able signal and an expansion disable signal expressing the enablement or disablement of the expansion of the air bag module at said assistant driver's seat respectively;

an information holding unit for holding either of said expansion enable information and expansion disable information, selection of either of said expansion enable information and said expansion disable information being based on the signal from said operation input circuit;

an acceleration detection unit for detecting an acceleration applied to the motor vehicle;

an information change inhibit unit for inhibiting any change in said expansion enable information and said expansion disable information held in said information holding unit if either said expansion able or disable signal changes to the expansion disable or able signal while an acceleration detected by said acceleration detection unit is exceeding a predetermined predetermined value, and for allowing change in said expansion enable information and said expansion disable information when an acceleration detected by said acceleration detection unit is below a predetermined value; and an expansion control circuit for controlling the expansion of said air bag module at said assistant driver's seat based on said either one of the expansion enable information and expansion disable information held in said information holding unit if the acceleration detected by said acceleration detection unit has exceeded the predetermined value.

5. The air bag controller as claimed in claim 4, wherein said information change inhibit unit is intended to inhibit the change of said either one of the expansion enable information and expansion disable information held in said information holding unit for a predetermined duration required at least for expanding the air bag module if the acceleration applied to the motor vehicle has exceeded the predetermined value.

6. The air bag controller as claimed in claim 4, wherein said information holding unit comprises a memory of a microprocessor.

* * * * *